Aug. 13, 1968   F. J. ZIOLKO   3,396,426
APPARATUS FOR PRODUCING SAUSAGES
Original Filed Nov. 26, 1965   6 Sheets-Sheet 3
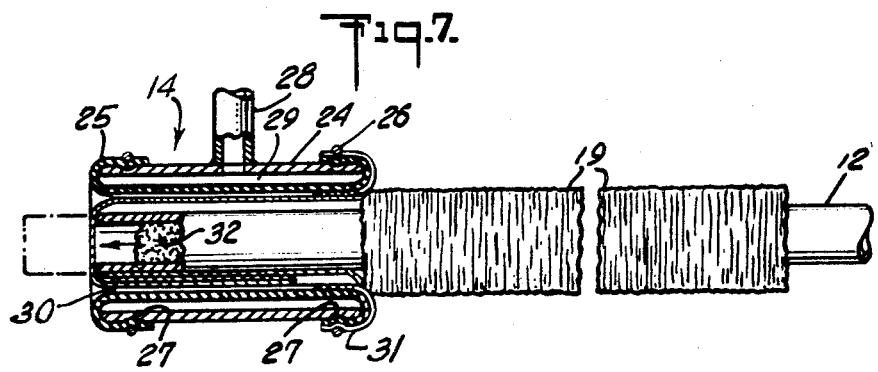
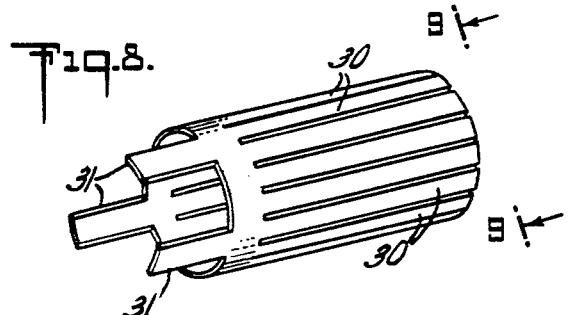
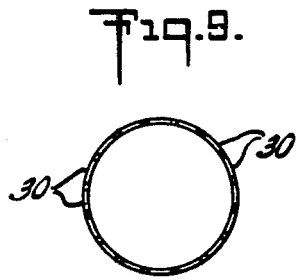
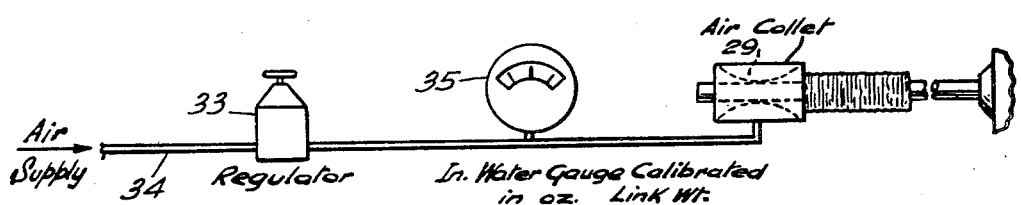
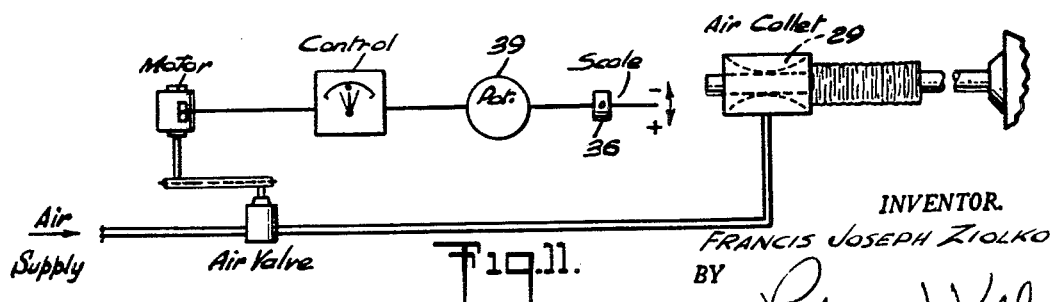
INVENTOR.
FRANCIS JOSEPH ZIOLKO
BY
ATTORNEY

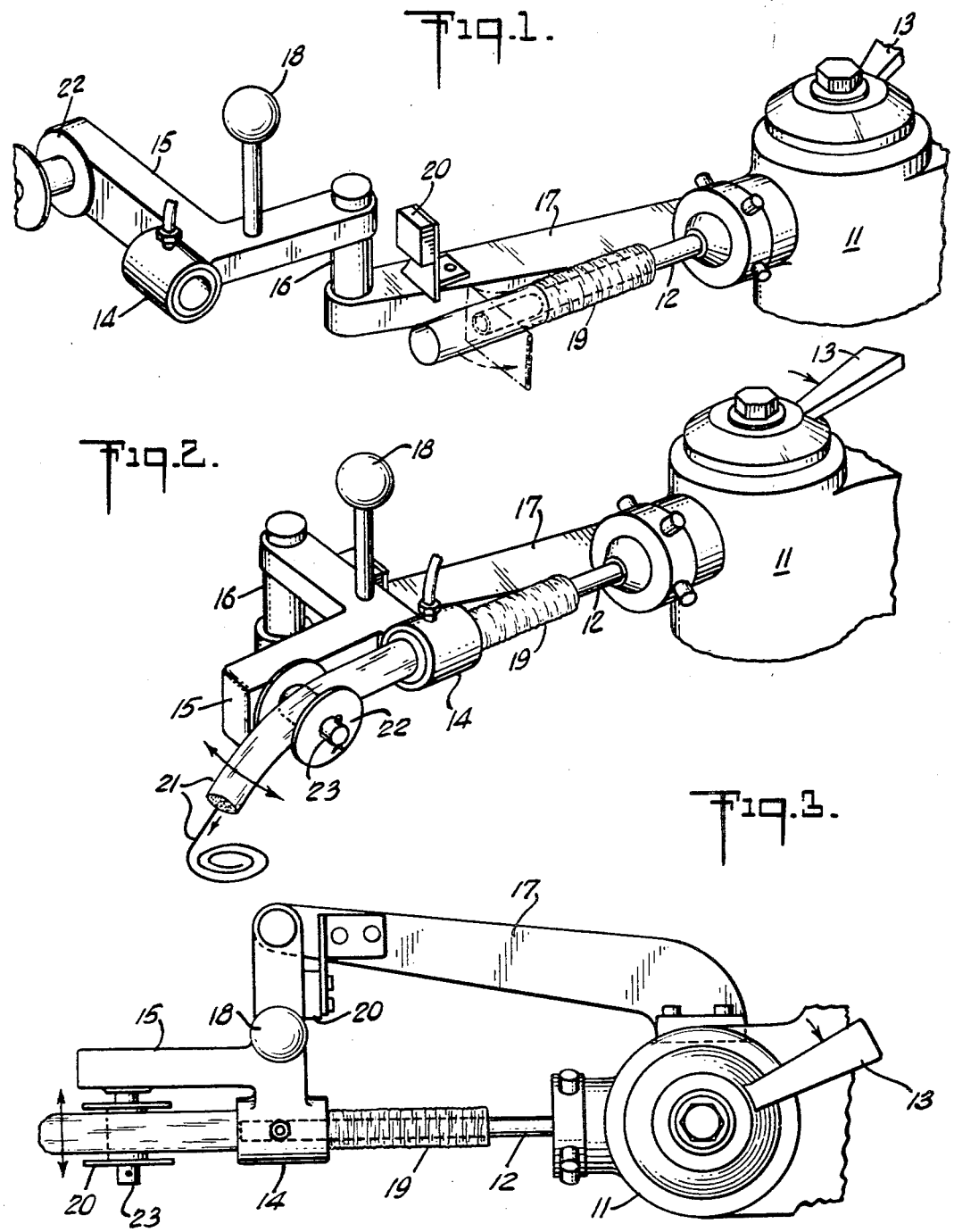

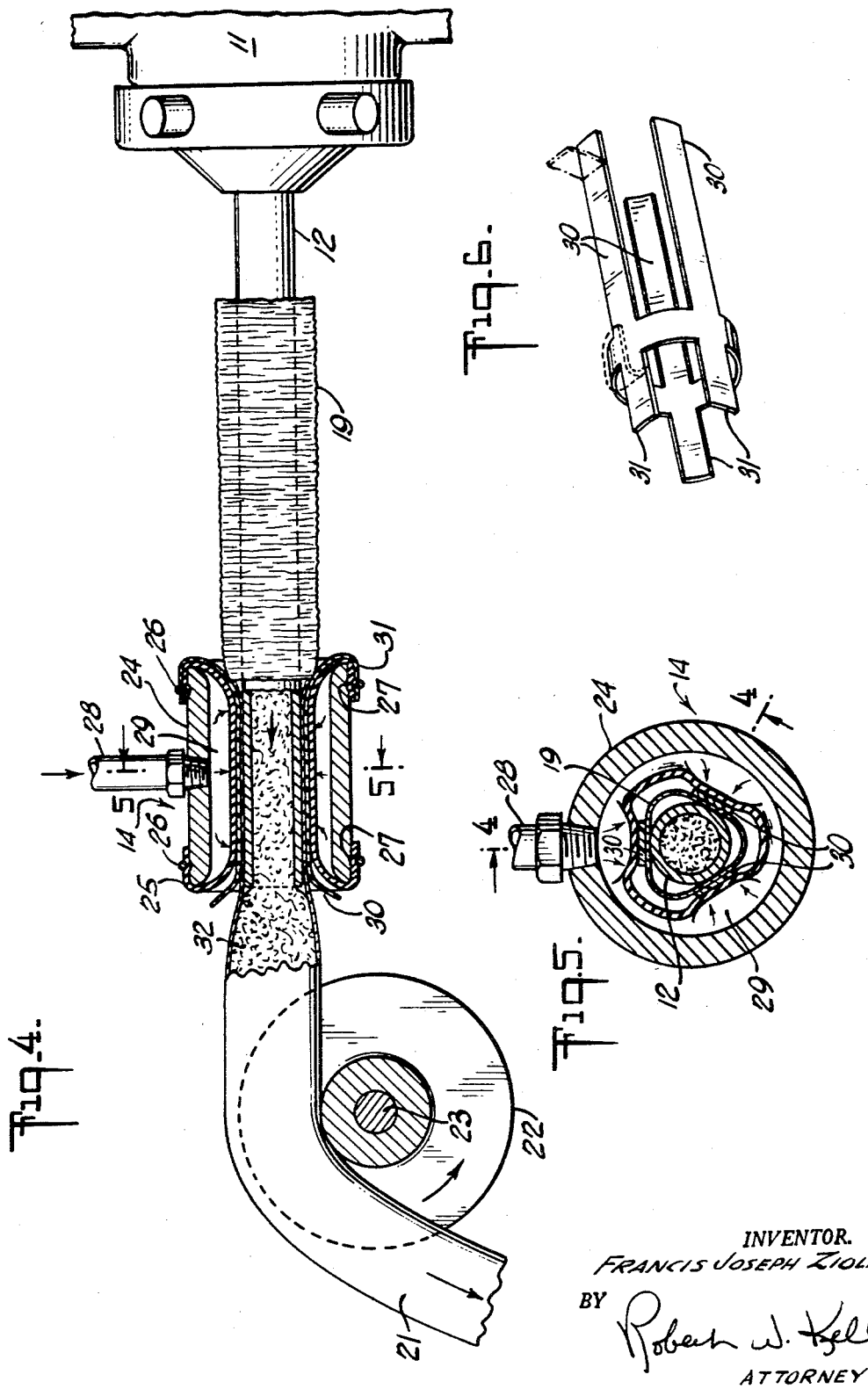

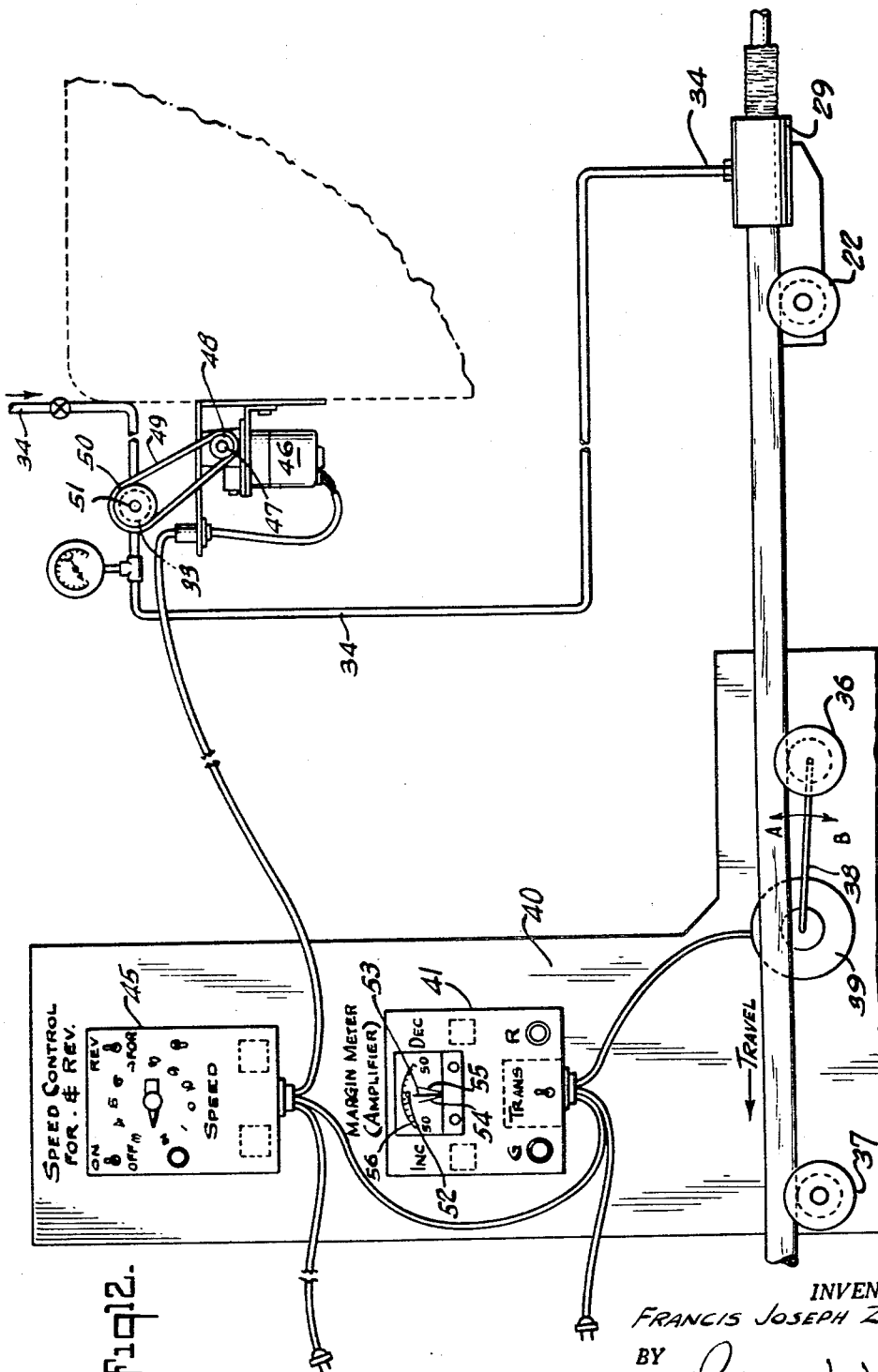

Aug. 13, 1968  F. J. ZIOLKO  3,396,426
APPARATUS FOR PRODUCING SAUSAGES
Original Filed Nov. 26, 1965  6 Sheets-Sheet 5

INVENTOR.
FRANCIS JOSEPH ZIOLKO
BY
ATTORNEY

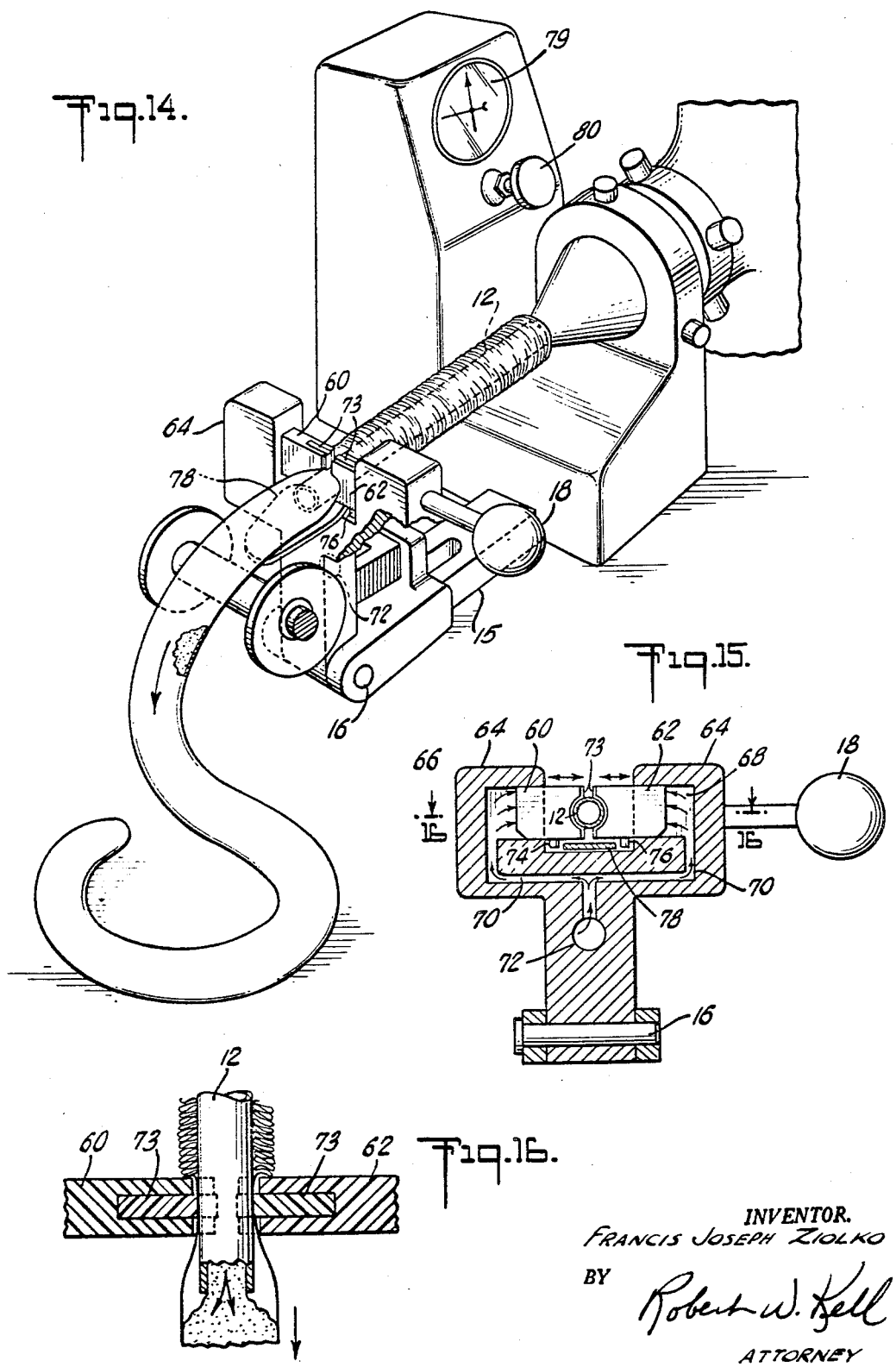

United States Patent Office 3,396,426
Patented Aug. 13, 1968

3,396,426
APPARATUS FOR PRODUCING SAUSAGES
Francis J. Ziolko, Somerville, N.J., assignor to Johnson & Johnson, a corporation of New Jersey
Original application Nov. 26, 1965, Ser. No. 509,865, now Patent No. 3,317,950, dated May 9, 1967. Divided and this application Sept. 29, 1966, Ser. No. 583,033
10 Claims. (Cl. 17—35)

ABSTRACT OF THE DISCLOSURE

A sausage stuffing apparatus is provided with an improved breaking or friction-producing assembly that is movable to press a casing that is being stuffed against the exterior cylindrical surface of the stuffing horn permitting the application of fully controlled pressure to the casing during the stuffing operation.

---

The present application is a division of application Ser. No. 509,865, filed Nov. 26, 1965, which issued as United States Patent No. 3,317,950 on May 9, 1967.

This invention relates to the packaging of foodstuff by extrusion and more specifically it relates to an apparatus for maintaining weight uniformity of the packaged product.

The invention will be described in connection with a process wherein a meat emulsion is packaged by extrusion into an edible collagen casing such as that described in U.S. Patent No. 3,123,482 to form sausages. It will be understood, however, that the method of this invention is equally applicable to a variety of meat and dairy products including wieners, salami, poultry, fish, and cheese, which may be packaged in natural or synthetic (viscose) casings.

In the manufacture of sausages, the comminuted meat emulsion is placed in a stuffer and is extruded therefrom under pressure through a hollow stuffing horn. A long, continuous, shirred length of the tubular casing to be stuffed is manually slipped over the stuffing horn with its end projecting beyond the discharge end of the horn. The operator folds this projecting end of the casing to close it and expels the meat emulsion through the stuffing horn into the casing. The discharge of the meat emulsion into the casing fills that portion of the casing that is directly in front of the horn and acts to pull the casing from the stuffing horn as it is filled. The operator's hand frictionally engages the stuffed sausage casing just behind the discharge end of the stuffing horn, and thereby retards the movement of the casing sufficiently to prevent wrinkling of the casing and to cause the desired compactness of the emulsion within the casing.

While a skilled operator is capable of producing sausage that is substantially uniform in density and diameter, the human element in judging the precise amount of hand pressure to be applied to the stuffing horn will result in variations in the weight of individual sausage links. Such variations are particularly apparent when sausages stuffed by different individuals at various times of the day and on different stuffing apparatus are compared. Since sausages are frequently sold in transparent packages containing a fixed number of sausages, the disadvantage in this weight variation will be obvious.

According to the present invention, it has now been found that the weight of sausage per unit length, and consequently the weight of individual sausage links, can be accurately and continuously controlled by mechanical means. This may be accomplished by providing an improved breaking or friction-producing assembly that is movable to press a casing that is being stuffed against the exterior cylindrical surface of the stuffing horn permitting the application of fully controlled pressure to the casing during the stuffing operation.

In a preferred embodiment of this invention, a scale is provided to sense the weight per unit length of the unlinked sausage after it leaves the stuffer. The scale is preferably disposed in the path of travel of the meat-filled casing to provide a signal that is indicative of the actual weight per unit length of the stuffed sausage.

In one embodiment of the invention, a cylindrical friction-producing assembly, or collet, may be placed over the end of the stuffing horn and concentric therewith so that it surrounds the casing. The inside diameter of this collet is variable and is controlled automatically by a signal from the scale in such a manner that the inside surface of the collet engages the outer surface of the casing as it is pulled from the stuffing horn during the stuffing operation. When the weight per unit length sensed by the scale is lower than a predetermined standard, the inside diameter of the collet is decreased thereby applying pressure to the casing as it slides between the collet and the stuffing horn. Thus when the inside diameter of the collet decreases in response to a decrease in weight as detected by the scale, the friction applied to the casing as it leaves the stuffing horn is increased and the amount of sausage stuffed into a given length is increased accordingly. If the scale indicates that the weight is too high, the diameter of the opening in the collet is increased thereby decreasing the amount of sausage forced into the casing.

Since the length of the sausage links is held constant by the conventional linking machinery, this control of the amount of sausage stuffed into a unit length of casing provides a control of the weight of individual sausage links. Thus, when the inside diameter of the collet decreases in response to a decrease in sausage weight as detected by the scale, the stuffing pressure within the casing is increased and the weight per unit length increases accordingly. If the scale indicates that the sausage weight is high, the diameter of the aperture in the collet is increased thereby decreasing the stuffing pressure to maintain the weight per unit length constant despite changes in the density of the meat emulsion or other variable factors.

This method of control is capable of achieving a close regulation of product uniformity which guarantees that each package will meet the legal minimum weight requirements while effecting appreciable savings in labor and material costs.

It is an object of this invention to provide apparatus for extrusion packaging whereby weight variations in the packaged product are substantially eliminated.

It is another object of this invention to provide an apparatus for controlling the rate at which a casing is stuffed with meat emulsion so as to maintain the weight per unit length of sausage constant.

It is a further object of this invention to provide an apparatus for regulating the weight per unit length of a sausage as it leaves the stuffing horn by continuous and automatic adjustment of the frictional pressure against the surface of the casing as it leaves the discharge end of the stuffing arm in accordance with changes in the weight of the stuffed product.

These and further objects and advantages of the invention will become apparent upon reference to the following specification and appended drawings wherein:

FIG. 1 is a perspective view of a conventional sausage stuffer with a shirred length of casing in position on the stuffing horn and shows a friction-producing collet in an open position.

FIG. 2 is a perspective view of the same apparatus showing the collet in a closed position.

FIG. 3 is a plan view of the apparatus illustrated in FIG. 2.

FIG. 4 is an enlarged side elevation of FIG. 2 in operative position and with parts in section as indicated by line 4—4 of FIG. 5.

FIG. 5 is a further enlarged cross-section through the collet of FIG. 4 on the line 5—5 of FIG. 4.

FIG. 6 is a perspective view of a collet bushing insert with flexible fingers.

FIG. 7 shows a modified form of collet with a modified bushing insert in operative position.

FIG. 8 is a perspective view of the flexible bushing insert of FIG. 7.

FIG. 9 is an end view thereof.

FIG. 10 is a schematic view of a controlled air supply to the collet.

FIG. 11 is a schematic view that illustrates one means of controlling the internal diameter of the collet.

FIG. 12 is a side elevation of an apparatus for automatically controlling the weight per unit length of stuffed sausage.

FIG. 14 is a perspective view of a modified embodiment of the present invention.

FIG. 15 is a sectional view of an improved breaking or friction producing assembly.

FIG. 16 is a fragmentary plan view taken on the line 16—16 of FIG. 15.

Figure 13:
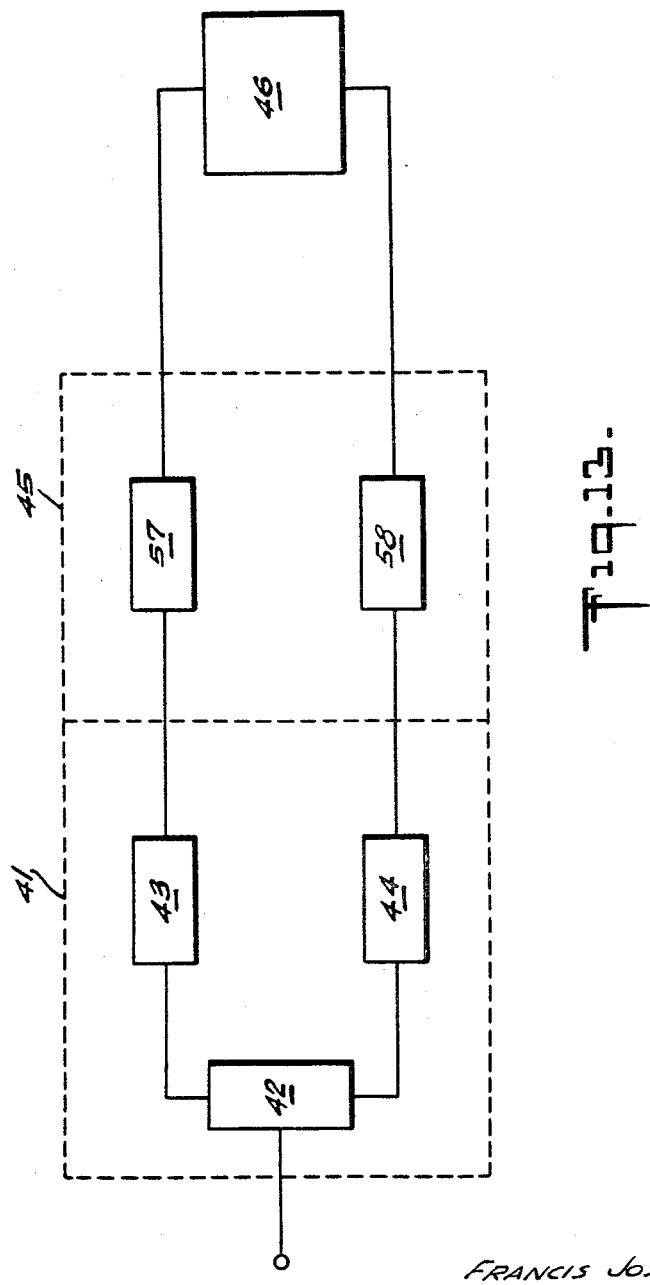
FIG. 13 is a schematic diagram of an electromechanical metering device and a variable speed control.

Referring to FIG. 1, there is shown a conventional sausage stuffing apparatus of the type widely used by meat packers. The apparatus comprises a storage reservoir 11 for the meat emulsion which is expelled through the stuffing horn 12 by air pressure. A handle 13 operates a valve (not shown) that determines the rate at which the meat emulsion is extruded through the horn. A collet 14 is mounted on a bracket 15 which pivots on a pin 16 that is attached to the stuffer 11 by a stationary bracket 17. A handle 18 enables the operator to swing the collet away from the end of the stuffing horn to an open position as illustrated in FIG. 1. When the collet is in this position, a shirred length of the casing 19 to be stuffed may be slipped over the stuffing horn. If the casing is not sealed at one end, the operator may fold over a short length of casing to the position shown by the dotted lines so that it may be properly filled.

The operator then swings the collet into the closed position so that it surrounds the casing and stuffing horn as shown in FIGS. 2 and 3. A magnetic stop 20 is bolted to the stationary bracket 17 in such a position that the collet indexes and is concentric with the stuffing horn throughout its length when the movable bracket 15 is flush against the stop.

The casing is then stuffed by opening the valve thus forcing the meat emulsion through the stuffing horn and into the casing. The stuffed casing 21, as it leaves the stuffing horn, passes over the guide 22 which rotates on the axle 23. This guide supports the stuffed casing, the weight of which would otherwise pull the casing away from the horn at a variable rate thereby causing variations in the amount of meat stuffed per unit length of casing.

Throughout the stuffing operation, the collet applies a controlled frictional pressure against the casing as will be apparent by reference to FIGS. 4–6. It will be noted from these drawings that the collet is constructed from two parts, a rigid cylinder 24 which may be formed of metal and a flexible cylindrical diaphragm 25 which is placed within the rigid cylinder and fastened thereto at either end in an airtight manner by two circular spring clamps 26 which fit in annular grooves 27. The rigid cylinder is tapped and threaded to receive the conduit 28 which is connected to a source of fluid pressure, such as compressed air. The internal diameter of the collet assembly is controlled by the pressure of the fluid in the annular space 29. As this pressure is increased the flexible diaphragm is forced inwardly reducing the diameter of the collet.

The internal flexible diaphragm is purposely designed to be larger than the external diameter of the stuffing horn so that the entire collet assembly can be easily swung away from the discharge end of the stuffing horn when replacing a shirred length of casing for stuffing. The large diameter of the flexible diaphragm causes it to wrinkle as pressure is applied through the conduit to reduce the internal diameter of the collet and results in uneven pressure being applied to the casing. To minimize this effect, an insert 30 is preferably placed within the collet so that when the collet is in operative position the insert will be between the flexible diaphragm and the casing being stuffed. One form of insert that has been used to advantage is illustrated in FIG. 6. The insert may be constructed of a flexible material such as stainless steel or plastic and is formed with projecting tabs 31 which may be formed as indicated by the dotted lines in FIG. 6 to anchor the insert in position within the collet.

The beginning of the stuffing operation is best illustrated in FIG. 7 which shows the collet in a closed position surrounding the end of the stuffing horn and the casing. A folded length of casing at the end of the horn is pinched between the collet and the stuffing horn as the collet is swung to the closed position. This seals the end of the casing so that the meat emulsion 32 will build up pressure within the casing and force it off the end of the horn. The viscosity of the meat emulsion extruded is dependent upon many factors such as the amount of water present therein, the degree of comminution, the temperature of the emulsion and the type of meat being used. Adjustments may be made in the length of the stuffing horn to accommodate emulsions that vary in this respect. When working with a soft meat emulsion of low viscosity the end of the stuffing horn should preferably extend beyond the end of the collet as indicated in dotted lines in FIG. 7.

A modified bushing insert for use between the outer surface of the casing and the inner diaphragm of the collet is shown in FIG. 8. This bushing has sixteen flexible plastic fingers closely spaced so as to prevent direct contact between the collet diaphragm and the casing.

A suitable means for controlling the pressure in the annulus 29 of the collet is a pressure regulator 33 shown in FIG. 10 connected to a source of air pressure by means of pressure line 34 and adjusted to apply a desired pressure as determined by a gauge 35 to the internal diaphragm of the collet. The gauge may conveniently be a sensitive water gauge calibrated in ounces or in inches of water. With the pressure regulator set to give a gauge reading of 13–15 inches of water an operator can rapidly stuff consecutive shirred lengths of casing with little variation in the weight per unit length of sausage. If it is desired to increase or decrease the weight per unit length of sausage the operator need only increase or decrease the gauge pressure and all casings will be uniformly stuffed to the desired density. Since frictional pressure is applied to the casing by the collet it is unnecessary for the operator to handle the casing as it leaves the stuffing horn.

The operation of the automatic regulating mechanism of the present invention which continuously monitors the weight of the stuffed casing as it passes to the linking machine and senses any change in the weight per unit length will be best understood by reference to FIGS. 11–13. To insure precise control yet fully automatic stuffing to a uniform weight per unit length there is provided means removed from the end of the stuffing horn for continuously monitoring the sausage weight. It is desirable to monitor the sausage weight at a point not too far removed from the stuffing horn, since in this way any change in weight can be quickly corrected by appropriately varying the pressure of the air within the collet.

The monitoring means of the present invention may be a tensioned weight roller 36 positioned equidistant between the guide roller 22 and a second guide roller 37 as illustrated in FIG. 12. As the filled sausage travels over these rollers in the direction of the arrow, the weight of the sausage between the rollers 22 and 37 will be continuously monitored by the deflection of the weight roller 36. Any deflection of the roller 36 in response to a weight variation in the sausage is transmitted by an operating arm 38 to a suitable rotary transducer or potentiometer 39 for rotary movement in the direction of the arrows A, B, FIG. 12.

In operation, the weight roller 36 supports the stuffed casing in its path of travel and is deflected either upwardly or downwardly by any change or variation in the weight of the casing as it moved between roller 22 and 37. depending upon whether the stuffed sausage is lighter or heavier than desired. In turn, this movement of roller 36 pivots arm 38 of potentiometer 39 in the direction of arrow A, FIG. 12, if the sausage is too light or in the direction of arrow B, FIG. 12, if the sausage is heavier than desired.

To translate this movement of roller 36 and arm 38 into an appropriate change in air pressure within the collet 14, potentiometer 39 is electrically associated with a suitable electro-mechanical metering device 41 which preferably includes an internal amplifier 42 and a pair of internal relays 43 and 44 (see FIG. 13).

Meter 41, in turn, is electrically connected to suitable variable speed control unit 45 for controlling the direction of rotation of a reversible speed reduced motor 46, mounted on the wall of the stuffing table. The output shaft 47 of motor 46 is provided with a drive sheave 48 around which is trained an endless belt 49. Belt 49 is also trained around a second sheave 50, mounted on the control shaft 51 of the air pressure regulator 33 for air supply line 34.

A suitable potentiometer 39 and metering device 41 are commercially available as a unit from the Matrix Controls Co., Inc., Somerville, N.J., under the trade designation Margin Meter, Model A–2, and is described in Matrix's bulletin, 5M–5–60, Bulletin A–3.

A suitable variable speed control unit 45 is commercially available from General Radio Co., Cambridge, Mass., under the trade designation Variac Speed Control, Type No. 1701–AK, and described in its Catalogue Q, issued May 1961.

A suitable reversible speed reducer motor is commercially available from Bodine Electric Co., Chicago, Ill., under the designation model NSH12RG, and described in its Bulletin S–2B, while a suitable air pressure regulator is commercially available from Kendall Pressure Regulator Co., West Babylon, N.Y., under the designation Model 10, and described in Kendall's Bulletin 6M–12–59.

*Operation*

Prior to the start of the automatic control operation of the present invention, the regulator 33 is manually adjusted by the operator until the stuffed casing, exiting from the stuffing horn and passing over rollers 22, 36 and 37 has the desired weight per unit length. The roller 36 is then so tensioned by the operator that its position corresponds to the desired weight per unit length of stuffed casing. Any subsequent variation of the position of roller 36 from its starting or normal position corresponding to this desired sausage weight is therefore due primarily to a change in the density of the meat emulsion or weight of the sausage moving thereover.

With regulator 33 properly adjusted by the operator, meter 41 is connected to a suitable source of electrical power which generates a normal signal through the meter 41 and the potentiometer 39. This normal signal is determined by the particular or normal position assumed by roller 36 and arm 38 when the stuffed casing is adjusted by the operator to achieve the desired weight at the start of the machine operations. The meter 41 is then appropriately adjusted so that the datum 52 and the registering needle 53 thereof are aligned for this normal signal. In addition, the operator sets the needles 54 and 55 to positions on the indicator dial 56 corresponding to the lower and upper tolerance limits, as dictated by weight control specifications. At the same time, the control motor 46 is coupled to air regulator 33 and the unit is ready for completely automatic control operation.

In the automatic operation of the present invention, as roller 36 and arm 38 are moved upwardly or downwardly from their normal positions by variations in the weight of the stuffed casing, the signal is correspondingly varied from the normal signal, as determined by the proper sausage weight. When arm 38 is pivoted upwardly in the direction of arrow A, FIG. 12, the signal is varied to indicate that the sausage weight is less than normal. This particular signal variation is amplified and causes needle 53 to move toward lower limit indicator needle 54. If the signal variation is sufficiently large, indicating a casing section having a weight less than the pre-set weight lower limit, needle 53 is moved past limit needle 54, thereby actuating relay 43.

As described hereinabove, meter 41 and speed control unit 45 are electrically interconnected. Thus, when relay 43 is actuated, it, in turn, effects actuation of the internal relay 57 of unit 45. Energization of relay 57 is operative to effect actuation of motor 46 to rotate output shaft 47 thereof in the proper direction to effect suitable movement of control shaft 51 through sheaves 48 and 50 and belt 49, for gradually opening regulator 33 to increase the air pressure in line 34 and decrease the internal diameter of the collet 14.

When the stuffed casing has returned to its normal weight as determined by roller 36, the signal from the potentiometer 39 returns to normal, de-energizing relays 43 and 57 and interrupting the operation of motor 46.

When the stuffed casing is too heavy as determined by roller 36 permitting arm 38 to pivot in the direction of arrow B, FIG. 12, the above-described process is repeated except that needle 53 moves past upper limit indicator needle 55 and, in this instance, relays 44 and 58 are actuated, which effects rotation of motor 46 in the appropriate direction to close regulator 33, thereby admitting less air into line 34 to increase the internal diameter of the collet 14.

Thus, there is disclosed a novel yet highly efficient and simple mechanism for continuously monitoring the weight of the stuffed casing as it passes from the stuffer, and correspondingly controlling the weight per unit length thereof in response to variations in the sausage weight to produce a stuffed sausage having a substantially uniform weight throughout its length.

FIG. 14 illustrates a sausage stuffing apparatus constructed in accordance with the present invention wherein the friction producing assembly applies pressure to the side walls of the stuffing horn 12. In the modification there illustrated, two opposed pressure shoes 60 and 62 are slidably mounted in an airtight housing 64 which may be formed of metal. As best illustrated in FIG. 15, which shows the shoes 60 and 62 in their extended position, the housing 64 is recessed to provide chambers 66 and 68 that communicate through a conduit 70 and inlet 72 with a source of fluid pressure, i.e., a tank of compressed air. One end of each pressure shoe is complementary to the external cylindrical surface of the stuffing horn and, in its extended position, contacts the cylinder along approximately 180° of arc. It will be understood that although the shoes 60 and 62 are shown in FIG. 15 to be movable in a horizontal plane, they would operate effectively in any other plane if movable toward and away from the axis of the cylinder. The pressure shoes 60 and 62 may be molded of Teflon (polytetrafluoroethylene). In a preferred embodiment of the invention a polyurethene resin insert 73 may be placed in the end of the pressure shoe that contacts the shirred casing as shown in FIG. 16. The polyurethene resin insert, being more flexible than Teflon (polytetrafluoroethylene), facilitates the application of a uniform pressure to the casing as it passes between the stuffing horn 12 and the pressure shoes 60 and 62 during the stuffing operation.

The friction producing assembly illustrated in FIG. 14 is mounted on a bracket 15 and may be positioned thereon to accommodate stuffing horns of various lengths. The housing 64 pivots on pin 16. A handle 18 enables the operator to swing the housing to an open position below the end of the stuffing horn. In this position a shirred length of casing to be stuffed may be slipped over the stuffing horn. When the operator swings the housing into the closed position illustrated in FIG. 14, cam followers 74 and 76, integral with the shoes 60 and 62, are moved by cam 78 to retract the pressure shoes thereby clearing the stuffing horn and the casing that is mounted thereon.

The casing is stuffed with a meat emulsion and passes over the guide 22 as previously described. Throughout the stuffing operation, the pressure shoes apply a controlled frictional pressure against the casing that is proportional to the fluid pressure within the chambers 66 and 68. Preferably a pressure gauge 79 is provided to indicate pressure changes affected by a fluid regulator 80.

It should be understood that the above description has been made with reference to the preferred embodiment illustrated in the drawings and that modifications and alterations can be made therein without departing from the invention, except as expressly limited hereinafter in the claims.

What is claimed is:

1. An apparatus for producing sausages, comprising a hollow tube through which sausage meat is extruded into a sausage casing mounted on said tube and being drawn thereoff by meat extruded from said tube to form a sausage;
a restrictive device positioned behind the end of said tube and surrounding the same, said restrictive device moving in response to fluid pressure toward said tube; thereby uniformly pressing the casing against the exterior surface of said tube; and
a pressure control means which varies the fluid pressure applied to the restrictive device in response to variation in the weight of said sausage.

2. The apparatus of claim 1, wherein said restrictive device is mounted on a pivot whereby it may be moved into engagement and out of engagement with the hollow tube.

3. The apparatus of claim 1, wherein the pressure control means is a fluid pressure regulator valve activated by an electric motor.

4. An aparatus for producing sausages, comprising a hollow tube through which sausage meat is extruded into a sausage casing mounted on said tube and being drawn thereoff by meat extruded from said tube to form a sausage;
a collet positioned behind the end of said tube and surrounding the same, said collet having a flexible member which moves in response to fluid pressure applied to one side thereof to vary the collet aperture; thereby uniformly pressing the casing against the exterior surface of said tube; and
a pressure control means which varies the fluid pressure applied to the flexible member in response to variation in the weight of said sausage.

5. An apparatus for producing sausages, comprising a hollow tube through which sausage meat is extruded into a sausage casing mounted on said tube and being drawn thereoff by meat extruded from said tube to form a sausage;
means for applying pressure to the casing positioned behind the end of said tube and surrounding the same;
a sensing unit disposed in the path of travel of said sausage for continuously monitoring the weight thereof and providing a signal indicative of that weight; and,
means controlled by said signal for actuating said pressure means whereby the casing is confined between the hollow tube and the pressure means to maintain the weight per unit length of said sausage substantially constant.

6. An apparatus as set out in claim 5, wherein said pressure means is in a collet having an aperture therethrough of variable diameter.

7. An apparatus for producing sausages comprising a hollow tube through which sausage meat is extruded into a sausage casing mounted on said tube and being drawn thereoff by meat extruded from said tube to form a sausage;
a collet positioned behind the end of said tube and surrounding the same comprising a flexible member having fluid pressure applied to one side thereof;
a scale for continuously monitoring the weight of the sausage and providing a signal indicative of that weight and a pressure valve controlled by said signal for adjusting the fluid pressure applied to the flexible member; whereby the casing is pressed against the exterior surface of said tube in response to variations in said signal.

8. An apparatus for producing sausages, comprising a hollow tube through which sausage meat is extruded into a sausage casing mounted on said tube and being drawn thereoff by meat extruded from said tube to form a sausage;
a housing having air chambers therein that communicate with a source of fluid pressure;
pressure shoes, slidably mounted in said air chambers and movable in response to air pressure toward the longitudinal axis of the hollow tube to contact the external surface of said tube thereby applying pressure thereto; and,
a pressure control means which varies the air pressure applied to the pressure shoes.

9. The apparatus of claim 8 wherein;
a sensing unit is disposed in the path of travel of said sausage for continuously monitoring the weight thereof and providing a signal indicative of that weight; and,
said pressure control means is actuated by said signal to vary the pressure applied by the pressure shoes to the tube and maintain the weight per unit length of said sausage substantially constant.

10. The apparatus of claim 9, wherein the sensing unit is a weight scale.

References Cited
UNITED STATES PATENTS

| | | | |
|---|---|---|---|
| 2,999,270 | 9/1961 | Knapp | 17—35 |
| 3,140,509 | 7/1964 | Muller | 17—33 |
| 3,148,408 | 9/1964 | Good | 17—35 |
| 3,192,559 | 7/1965 | Short | 17—35 |

LUCIE H. LAUDENSLAGER, *Primary Examiner.*